United States Patent
Jagoda

(10) Patent No.: US 9,121,426 B2
(45) Date of Patent: Sep. 1, 2015

(54) BRACKET CLIP

(75) Inventor: Aaron M. Jagoda, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 170 days.

(21) Appl. No.: 13/878,874

(22) PCT Filed: Nov. 8, 2011

(86) PCT No.: PCT/US2011/059707
§ 371 (c)(1),
(2), (4) Date: Apr. 11, 2013

(87) PCT Pub. No.: WO2012/064694
PCT Pub. Date: May 18, 2012

(65) Prior Publication Data
US 2013/0199001 A1    Aug. 8, 2013

Related U.S. Application Data

(60) Provisional application No. 61/411,888, filed on Nov. 9, 2010.

(51) Int. Cl.
| F16B 17/00 | (2006.01) |
| F16B 5/06 | (2006.01) |
| F16B 21/12 | (2006.01) |

(52) U.S. Cl.
CPC ............... *F16B 17/00* (2013.01); *F16B 5/0657* (2013.01); *F16B 21/125* (2013.01); *Y10T 24/309* (2015.01); *Y10T 24/42* (2015.01); *Y10T 24/44026* (2015.01); *Y10T 24/45105* (2015.01); *Y10T 29/49826* (2015.01)

(58) Field of Classification Search
CPC . Y10T 24/42; Y10T 24/309; Y10T 24/44026; Y10T 24/45105
USPC ............................ 24/297, 453, 458, 581.11
See application file for complete search history.

(56) References Cited

U.S. PATENT DOCUMENTS

| 4,712,341 A | 12/1987 | Harris, Jr. et al. |
| 4,739,543 A * | 4/1988 | Harris, Jr. ........................ 24/297 |
| 5,191,513 A * | 3/1993 | Sugiura et al. ................. 361/752 |
| 5,291,639 A * | 3/1994 | Baum et al. ..................... 24/297 |
| 5,649,783 A * | 7/1997 | Ichikawa et al. .............. 403/386 |
| 5,662,375 A * | 9/1997 | Adams et al. ................. 296/214 |
| 6,071,131 A * | 6/2000 | Pliml, Jr. .......................... 439/95 |
| 6,752,950 B2 * | 6/2004 | Clarke ........................... 264/255 |
| D523,327 S * | 6/2006 | Clarke ............................ D8/380 |
| 7,337,505 B1 | 3/2008 | Scroggie et al. |
| 7,549,830 B2 * | 6/2009 | Cooley et al. ................. 411/508 |
| 7,878,749 B2 * | 2/2011 | Edland .......................... 411/508 |
| 8,333,540 B2 * | 12/2012 | Nakazato ...................... 411/508 |
| 8,458,862 B2 * | 6/2013 | Reznar .......................... 24/292 |
| 2004/0183333 A1 | 9/2004 | Benedetti |
| 2006/0153663 A1 | 7/2006 | Brewka |
| 2012/0227219 A1 * | 9/2012 | Kabeya et al. .................. 24/453 |

OTHER PUBLICATIONS

International Search Report and Written Opinion corresponding to PCT/US2011/059707, dated Mar. 13, 2012.

* cited by examiner

*Primary Examiner* — Robert J Sandy
*Assistant Examiner* — Louis Mercado

(57) ABSTRACT

A snap-in clip having a low profile head and a pair of integral spaced legs extending away from the head to an insertion base. A wing element is angled upwardly away from one side of the insertion base with a free edge projecting towards the underside of the head. The clip is adapted for insertion through an access opening in an insert flange projecting through a mounting bracket to secure the insert flange in place in transverse relation to the mounting bracket.

17 Claims, 3 Drawing Sheets

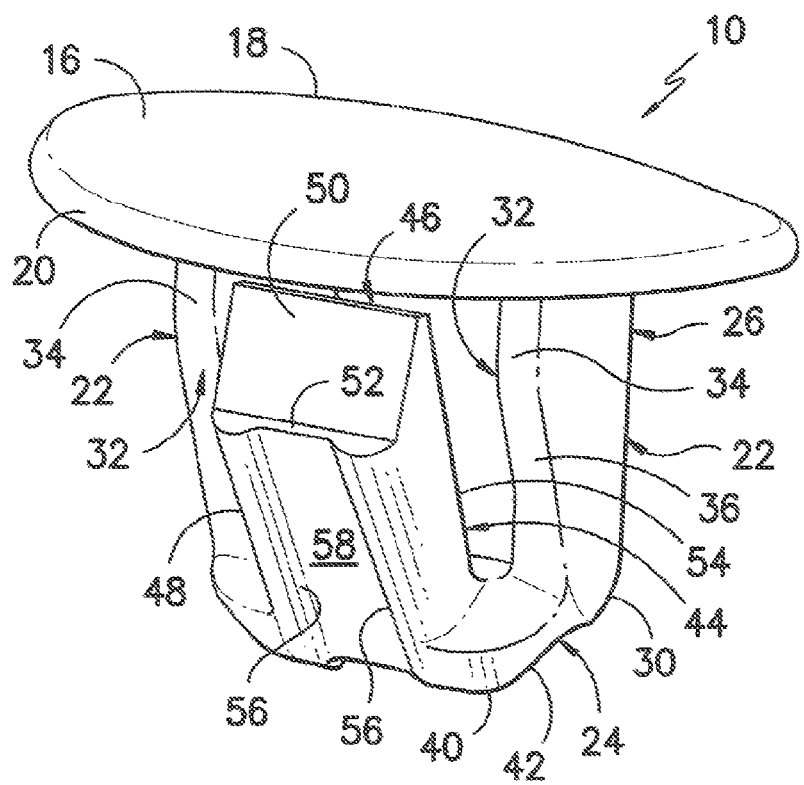
FIG. -1-
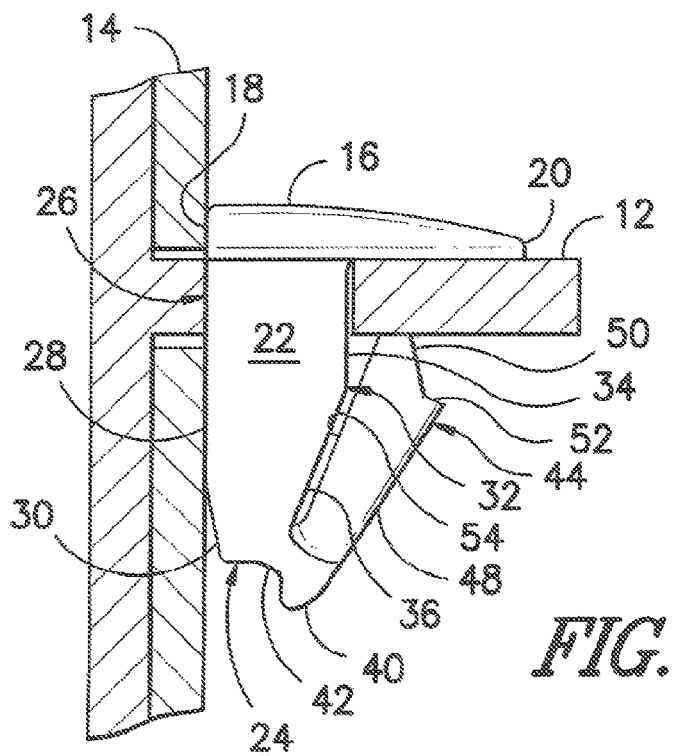
FIG. -2-

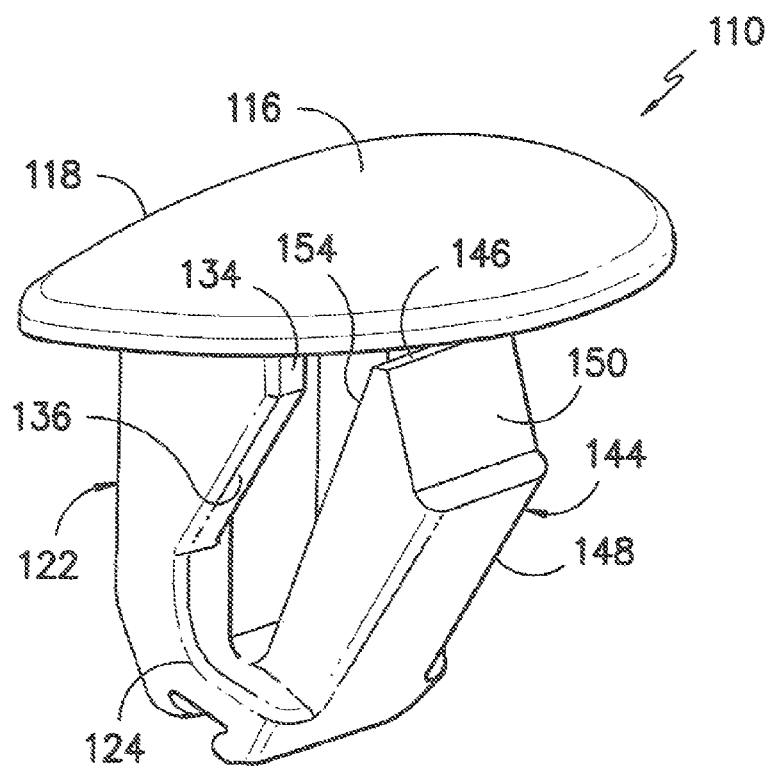
FIG. -3-
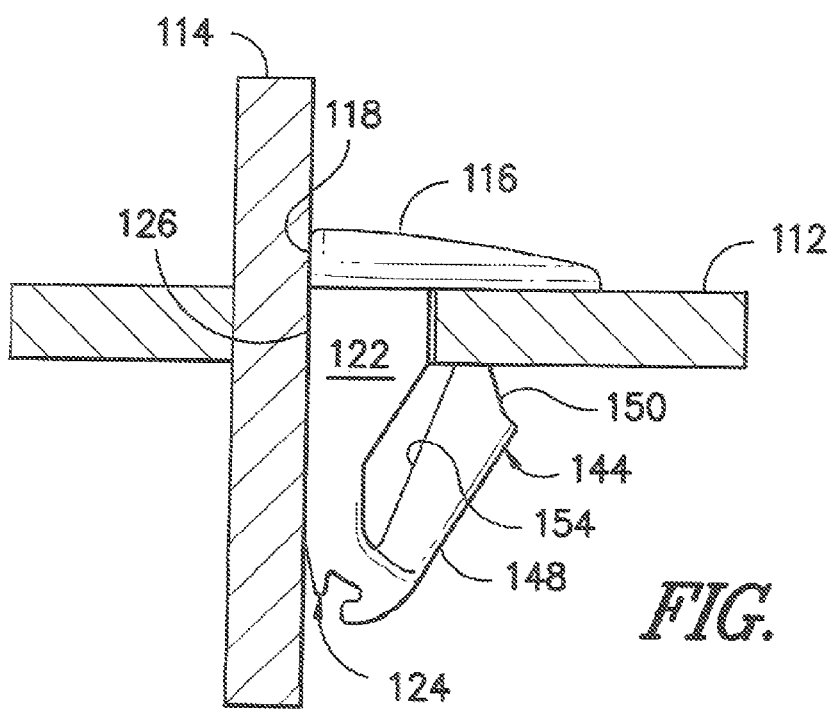
FIG. -4-

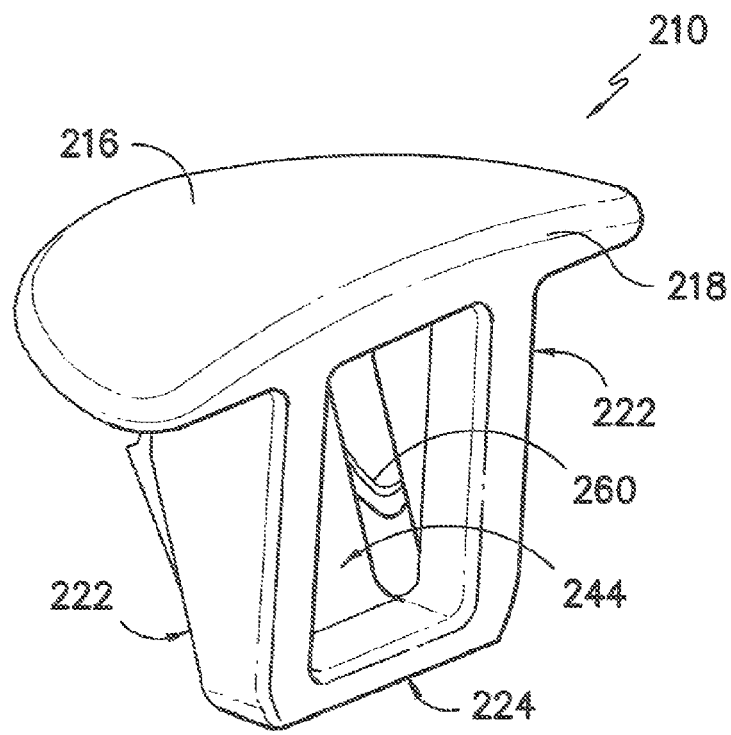
FIG. -5-
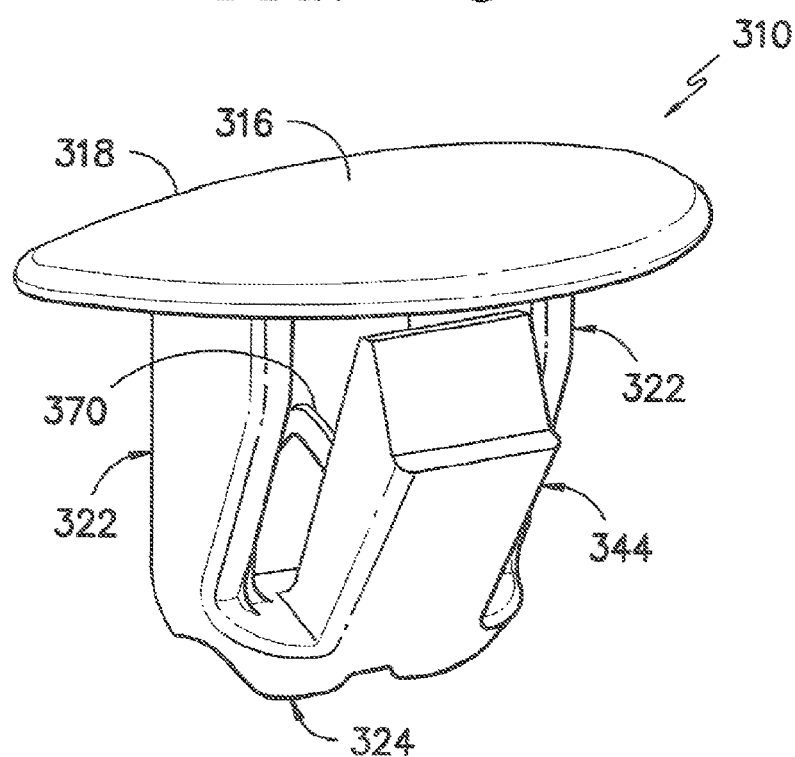
FIG. -6-

BRACKET CLIP

CROSS REFERENCE TO RELATED APPLICATION

This application is a National Phase of International Application Number PCT/US2011/059707, filed Nov. 8, 2011, and claims priority from, U.S. provisional application 61/411,888 filed Nov. 9, 2010.

TECHNICAL FIELD

The present invention relates generally to a bracket clip, and more particularly to a snap-in bracket clip having a snap wing feature on one side with an opposing side free of snap wings to facilitate placement in abutting relation to a bracket surface. The bracket clip is adapted to hold an insert in place projecting in transverse relation through the bracket.

BACKGROUND OF THE INVENTION

In various environments, a decorative or structural component may be mounted in place using an operatively connected insert flange mounted through a bracket. One such environment of use is in mounting decorative radiator grills in transportation vehicles. In such structures, the mounting bracket has one or more openings which receive protruding insert flange structures. In order to hold the bracket and the insert flange together, it is known to use metal spring clips that are inserted through the protruding structures to block their withdrawal. While metal spring clips have good strength, one difficultly with past structures has been avoiding relative movement following assembly which can lead to rattling noise. Another problem with metal spring clips has been gradual loosening over time as spring action in the metal decreases. Plastic snap-in clips having a generally "W" shaped profile are known, but such structures require free space on both sides of the clip thereby making them unsuitable for many bracket mounting applications. In particular, it may be difficult to mount such "W" clips in flush relation to a bracket wall.

In light of the above, a continuing need exists for a polymeric clip structure having a configuration and performance suitable for securing an insert flange in place relative to a mounting bracket. In particular, there is a need for a polymeric clip structure adapted for placement in flush relation to an outboard wall bracket oriented in adjacent relation to the length dimension of the clip, wherein the clip secures an insert flange element projecting through the bracket.

SUMMARY OF THE INVENTION

The present invention provides advantages and alternatives over the prior art by providing a snap-in clip having a low profile head and a pair of spaced legs extending away from the head to an insertion base. A wing element is angled upwardly away from one side of the insertion base with a free edge projecting towards the underside of the head.

In accordance with one exemplary aspect, the present invention provides a snap-in bracket clip adapted for insertion through an access opening in an insert flange projecting through a mounting bracket to secure the insert flange in place in transverse relation to the mounting bracket. The bracket clip includes a low profile head portion defining a finger engagement press tab projecting away from an outboard boundary edge to an inboard boundary edge. The outboard boundary edge is adapted to engage a surface of the mounting bracket at a position above the insert flange. A pair of spaced-apart legs is integral with the head portion and extend away from the head portion. Each of the legs has a wedge-shaped configuration including an upper portion of uniform width adapted for disposition at the interior of the access opening and a tapered lower portion. The lower portion includes an outboard contact surface of non-tapered configuration adapted to engage a surface of the mounting bracket at a position below the insert flange. An integral base extends between distal ends of the legs such that the base and the legs cooperatively form a "U" shaped profile. A single integral snap wing extends in angled relation away from the base on one side of clip with a free edge disposed in opposing relation below the underside of the head portion.

A method of securing an insert flange projecting through a mounting bracket using a single sided wing clip is also provided.

BRIEF DESCRIPTION OF THE DRAWINGS

FIG. 1 is a schematic perspective view illustrating an exemplary embodiment for a snap-in bracket clip in accordance with the present invention;

FIG. 2 is a schematic side view of the snap-in bracket clip of FIG. 1 in use holding an insert in transverse relation to a support bracket;

FIG. 3 is a schematic perspective view illustrating another exemplary embodiment for a snap-in bracket clip in accordance with the present invention;

FIG. 4 is a schematic side view of the snap-in bracket clip of FIG. 1 in use holding an insert in transverse relation to a support bracket;

FIG. 5 is a schematic perspective view illustrating another exemplary embodiment for a snap-in bracket clip in accordance with the present invention; and FIG. 6 is a schematic perspective view illustrating yet another exemplary embodiment for a snap-in bracket clip in accordance with the present invention.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and of being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed and equivalents thereof as well as additional items and equivalents thereof.

DETAILED DESCRIPTION OF THE PREFERRED EMBODIMENTS

Reference will now be made to the drawings, wherein to the extent possible, like elements are designated by like reference numerals in the various views. It is to be understood that the relative terms "inboard" and "outboard" are used in reference to the position of the clip relative to the bracket as illustrated in FIGS. 2 and 4, with the bracket position being designated as outboard from the clip. Referring to FIGS. 1-3, a first exemplary embodiment of a snap-in bracket clip 10 is illustrated. By way of example only, and not limitation, the bracket clip 10 may be used to secure an insert flange 12 of a decorative radiator grille in place relative to a mounting bracket 14 on an automotive vehicle (FIG. 2). By way of example only, and not limitation, the bracket clip 10 may be formed as a unitary structure from polymeric acetal material or other suitable polymeric material by techniques such as injection molding or the like. However, other polymeric or non-polymeric materials and other formation techniques may likewise be utilized if desired.

In the illustrated exemplary construction, the bracket clip 10 includes a head 16 defining a finger engagement press tab having a relatively large surface area for application of pressure during press-fit insertion of the bracket clip 10 through an access opening in the insert flange 12. As best seen through joint reference to FIGS. 1 and 2, the head 16 may be asymmetrical with an outboard boundary edge 18 adapted to rest against an inboard surface of the mounting bracket 14. The head 16 projects away from the outboard boundary edge 18 to an inboard boundary edge 20 to define a relatively low profile platform structure.

By way of example only, the head 16 may have a configuration in the shape of a partial ellipse in which the outboard boundary edge 18 is straight or only slightly curved and the inboard boundary edge 20 has a substantial convex bowed curvature. As best seen in FIG. 2, in the exemplary construction the underside of the head 16 may be planar to rest in contacting relation with an upper surface of the insert flange 12 following insertion. As shown, the inboard boundary edge 20 may have a reduced thickness relative to the outboard boundary edge 18. This variable thickness may be provided by use of a smooth, convex, curved transition across the upper surface of the head 16. As will be appreciated, the broad geometry of the head 16 facilitates pressure application by a user during the insertion process. The low profile aids in avoiding unwanted displacement after insertion.

As best seen in FIG. 1, in the illustrated configuration a pair of generally wedge-shaped spaced legs 22 extend downwardly from the underside of the head to a base 24 to form a generally "U" shaped profile. As shown, the legs 22 are integral with the portion of the head with enhanced thickness adjacent the outboard boundary edge 18 to facilitate strength at the location of connection. In the illustrated construction, the legs 20 have a generally wedge-shaped construction. The upper portion of the legs 22 has a uniform width dimension in the direction extending away from the mounting bracket 14. At a lower portion of the legs, this width dimension tapers towards the base 24.

As best seen in FIG. 2, in the exemplary configuration each leg 22 includes an outboard leg surface 26. An upper portion of the outboard leg surface 26 forms an extended length outboard contact surface 28 which may be generally coplanar with the adjacent segment of the outboard boundary edge 18 on the head 16. In this regard, the outboard boundary edge 18 of the head and the outboard contact surface 28 of the legs cooperatively engage the adjacent surfaces of the mounting bracket 14 above and below the insert flange. As shown, the outboard leg surface 26 may also include a tapered segment 30 at a lower portion extending inwardly towards the base 24 and away from the outboard contact surface 28. As shown, the tapered segment 30 causes the lower portion of the leg 22 to angle away from the surface of the mounting bracket 14 and reduces the effort required for insertion into the access opening within the insert flange 12. Of course, the tapered segment 30 may be elevated if desired such that the outboard leg surface is continuous without a lower angled portion.

In the illustrated exemplary construction, each leg also includes an inboard leg surface 32 of dog-leg configuration which faces away from the mounting bracket 14 in the inserted condition. The inboard leg surface 32 includes an upper linear segment 34 which is substantially parallel to the outboard contact surface 28. The upper portion of the leg 22 thus has a substantially uniform width dimension adapted to fit in relatively close tolerance within the access opening in the insert flange 12. As shown, in the exemplary construction the length dimension of the upper linear segment 34 is shorter than the outboard contact surface 28. In this regard, the length dimension of the upper linear segment 34 is preferably slightly greater than the depth of the access opening in the insert flange 12 to provide support to the surrounding portions of the access opening. The inboard leg surface 32 also includes an outwardly tapered segment 36 extending towards the base 24 in generally converging relation with the inwardly tapered segment 30. The lower portions of the outboard leg surface 26 and the inboard leg surface 32 thus converge towards engagement with the base 24.

As noted previously, the legs 22 and the base 24 cooperatively define a generally "U" shaped structure. That is, the base 24 extends in spanning relating between the lower portions of the legs 22. In the illustrated exemplary construction, the base itself includes a downwardly projecting nose 40 (best seen in FIG. 2) which is angled downwardly in transverse angled relation to the plane defined by the outboard leg surface 26 so as to point generally towards the mounting bracket 14 upon installation. The nose 40 aids in guiding the bracket clip 10 into the access opening in the insert flange during a press fit installation process. As shown, the base 24 may include a concave indenture 42 defining a channel running along the length of the base 24 between the legs 22. The concave indenture 42 is positioned between the tapered segment 30 and the nose 40 and may facilitate structural flexibility.

As will be appreciated, once the bracket clip 10 is in the inserted condition, the legs 22 in concert with the head 16 act to block relative movement between the mounting bracket 14 and the insert flange 12. In this regard, the head 16 projects beyond the access opening in the insert flange and is blocked from passage through the access opening. Moreover, since the width dimension at the upper portion of the legs 16 closely approximates the interior spacing of the access opening in the direction extending away from the mounting bracket, (FIG. 2) there is little relative movement between the bracket clip 10 and the insert flange 12.

As shown, an integral snap wing 44 of resilient character extends in angled relation upwardly away from the base 24 such that when the bracket clip 10 is in the inserted condition, the legs 22 are positioned between the snap wing 44 and the mounting bracket 14. In a normal, unbiased condition a free edge 46 of the snap wing 44 projects towards the underside of the head 16. In the illustrated exemplary configuration, the snap wing 24 has a generally beveled profile (FIG. 2) including a lower wing segment 48 having an inboard face with a first angle relative to the underside of the head 16 and an upper wing segment 50 with an inboard face of substantially steeper angle extending to the free edge 46 thereby forming a knife edge construction. As illustrated, an inboard surface ledge 52 may be disposed at the transition between the lower wing segment 48 and the upper wing segment 50. However, a smooth angle transition also may be used. In the illustrated exemplary construction, the outboard side 54 of the snap wing 44 may have a substantially continuous angle with no bevel although a variation in angle may be used if desired.

In the exemplary configuration which is illustrated, the inboard side of the lower wing segment 48 has a knuckled or wave-like configuration with one or more (preferably two) longitudinal raised ribs 56 (FIG. 1). A depression 58 is disposed between the ribs. The raised ribs 56 have an outer curved profile of generally hemispherical configuration and act to strengthen the snap wing 44 without unduly limiting flexibility. As will be appreciated, during insertion of the bracket clip 10 into the access opening in the insert flange 12, the snap wing 44 engages the side of the access opening and is caused to flex to a more vertical orientation in order to permit passage. The depression 58 promotes flexibility to reduce force requirements during insertion. In addition, the curved surface of the raised ribs presents a relatively small contact surface area for engagement between the snap wing 44 and the opposing surface of the access opening during insertion. This small contact surface area reduces friction forces during insertion. At the same time, the raised ribs 56 provide enhanced strength and resiliency to the snap wing 44. Such strength and resiliency avoids breakage and promotes a "snap-back" action by the snap wing 44 to assume the locked position shown generally in FIG. 2 following completion of the insertion process.

In use, when the bracket clip 10 is in the inserted condition as shown in FIG. 2, the free edge 46 of the snap wing 44 is pressed against the underside of the insert flange 12 at a position inboard from the access opening. This clamps the inboard portion of the insert flange 12 between the head 16 and the snap wing 44 with a continuous biasing force applied between the insert flange 12 and the snap wing 44. The biasing force between the insert flange 12 and the snap wing 44 acts to continuously urge the bracket clip 10 to tilt downwardly and to maintain the inserted condition as shown. However, all major load forces are carried by the legs 22. Thus, the continuous biasing force by the snap wing 44 holds the bracket clip 10 in place such that the legs 22 are positioned to carry the major applied loads. At the same time, the continuous biased positioning reduces the potential for undesirable rattles.

FIGS. 3 and 4 illustrate another exemplary embodiment for a bracket clip 110 in accordance with the present invention wherein elements corresponding to those described previously are designated by like reference numerals increased by 100. As will be appreciated, in this embodiment, the lower wing segment 148 of the snap wing 144 is substantially planar without the inclusion of strengthening ribs. However, the operation is substantially as described previously. More particularly, when the bracket clip 110 is in the inserted condition as shown in FIG. 4, the free edge 146 of the snap wing 144 is pressed against the underside of an inboard portion of the insert flange 112 such as a grill flange or the like. This, in turn, acts to continuously urge the bracket clip 110 downwardly to maintain the inserted condition as shown. However, all major load forces are carried by the legs 122. Thus, the continuous biasing force by the wing segment 148 holds the bracket clip 110 in place such that the legs 122 are positioned to carry the major applied loads.

FIG. 5 illustrates another exemplary embodiment for a bracket clip 210 in accordance with the present invention wherein elements corresponding to those described previously are designated by like reference numerals within a 200 series. As will be appreciated, this embodiment has a structure and function substantially as described previously. However, a downwardly curved support hinge 260 (only one shown) such as an elbow hinge or the like extends between each of the legs 222 and the snap wing 244 which may be of any suitable configuration. The support hinges 260 may be formed from either the same or different material as the legs 222 and snap wing 244. In this regard, the support hinge may be plastic which may be molded in place by injection molding or other suitable process as part of a unitary clip structure. It is also contemplated that the support hinges may be non-polymeric material such as metal or the like which is secured in place by insert molding or other suitable practices as may be desired. As will be appreciated, the presence of the support hinges may aid in facilitating controlled hinging movement of the snap wing 224 without undue twisting.

FIG. 6 illustrates another exemplary embodiment for a bracket clip 310 in accordance with the present invention wherein elements corresponding to those described previously are designated by like reference numerals within a 300 series. As will be appreciated, this embodiment has a structure and function substantially as described previously. However, an upwardly curved support hinge 370 such as an elbow hinge or the like extends between each of the legs 322 and the snap wing 344. The support hinges 370 may be formed from either the same or different material as the legs 322 and snap wing 344. In this regard, the support hinge may be plastic which may be molded in place by injection molding or other suitable process as part of a unitary clip structure. It is also contemplated that the support hinges may be non-polymeric material such as metal or the like which is secured in place by insert molding or other suitable practices as may be desired. As will be appreciated, the presence of the support hinges may aid in facilitating controlled hinging movement of the snap wing 324 without undue twisting.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

Various features of the invention are set forth in the following claims.

What is claimed is:

1. A snap-in bracket clip adapted for insertion through an access opening in an insert flange projecting through a mounting bracket to secure the insert flange in place in transverse relation to the mounting bracket, the bracket clip comprising:

a head portion defining a finger engagement press tab projecting away from an outboard boundary edge to an inboard boundary edge, the outboard boundary edge being adapted to engage a surface of the mounting bracket at a position above the insert flange;

a pair of spaced-apart legs integral with the head portion and extending away from the head portion, each of the legs having a wedge-shaped configuration including an upper portion bordered by parallel inboard and outboard edges adapted for disposition at an interior of the access opening and a tapered lower portion, wherein the lower portion includes an outboard contact surface of non-tapered configuration adapted to engage a surface of the mounting bracket at a position below the insert flange, an integral base extending between distal ends of the legs such that the base and the legs cooperatively form a "U" shaped profile; and a single integral snap wing extending in angled relation away from the base, the single integral snap wing being disposed on an inboard side of the bracket clip and including a free edge disposed below an underside of the head portion, wherein the single integral snap wing includes a lower wing segment having an outer surface forming a first angle relative to the underside of the head portion and an upper wing segment extending to the free edge, the upper wing segment having an outer surface forming a second, steeper angle relative to the underside of the head portion wherein the outer surface of the lower wing segment includes a plurality of longitudinal raised ribs of curved profile extending at least partially along a length of the lower wing segment.

2. The snap-in bracket clip as recited in claim 1, wherein the bracket clip is of unitary molded construction of polymeric material.

3. The snap-in bracket clip as recited in claim 2, wherein the outboard boundary edge of the head portion is substantially straight and the inboard boundary edge has a convex bowed configuration.

4. The snap-in bracket clip as recited in claim 3, wherein the head portion has a variable thickness with enhanced thickness at the outboard boundary edge relative to the inboard boundary edge, and wherein the head portion includes a convex curved upper surface defining a curved surface extending between the outboard boundary edge and the inboard boundary edge.

5. The snap-in bracket clip as recited in claim 4, wherein the head portion includes a planar lower surface adapted for disposition in overlying relation to an upper surface of the insert flange.

6. The snap-in bracket clip as recited in claim 5, wherein each of the legs includes an inboard leg surface of dog-leg configuration including an upper linear segment oriented in parallel relation to the outboard contact surface, the inboard leg surface further including a lower angled surface oriented in a plane transverse to a plane defined by the outboard contact surface.

7. The snap-in bracket clip as recited in claim 6, wherein each of the legs includes an inwardly tapered segment extending away from the outboard contact surface to the base.

8. The snap-in bracket clip as recited in claim 6, wherein the base includes a nose projecting in angled, transverse relation to a plane defined by the outboard contact surface.

9. The snap-in bracket clip as recited in claim 6, wherein a surface ledge is disposed at an intersection of the lower wing segment and the upper wing segment.

10. A snap-in bracket clip adapted for insertion through an access opening in an insert flange projecting through a mounting bracket to secure the insert flange in place in transverse relation to the mounting bracket, the bracket clip comprising:
a head portion defining a finger engagement press tab projecting away from an outboard boundary edge to an inboard boundary edge, the outboard boundary edge being adapted to engage a surface of the mounting bracket at a position above the insert flange;
a pair of spaced-apart legs integral with the head portion and extending away from the head portion, each of the legs having a wedge-shaped configuration including an upper portion bordered by parallel inboard and outboard edges adapted for disposition at an interior of the access opening and a tapered lower portion, wherein the lower portion includes an outboard contact surface of non-tapered configuration adapted to engage a surface of the mounting bracket at a position below the insert flange,
an integral base extending between distal ends of the legs such that the base and the legs cooperatively form a "U" shaped profile; and
a single integral snap wing extending in angled relation away from the base, the single integral snap wing being disposed on an inboard side of the bracket clip and including a free edge disposed below an underside of the head portion, further comprising at least one elbow hinge operatively connecting the snap wing to at least one leg.

11. A snap-in bracket clip adapted for insertion through an access opening in an insert flange projecting through a mounting bracket to secure the insert flange in place relative to the mounting bracket, the bracket clip comprising:
a head portion defining a finger engagement press tab projecting away from a linear outboard boundary edge to an inboard boundary edge of convex bowed configuration, the outboard boundary edge being adapted to engage a surface of the mounting bracket at a position above the insert flange, wherein the head portion has a variable thickness with enhanced thickness at the outboard boundary edge relative to the inboard boundary edge;
a pair of spaced-apart legs integral with the head portion and extending away from the head portion, each of the legs having a wedge-shaped configuration including an upper portion bordered by parallel inboard and outboard edges adapted for disposition at an interior of the access opening and a tapered lower portion, wherein the lower portion includes an outboard contact surface of non-tapered configuration adapted to engage a surface of the mounting bracket at a position below the insert flange,
an integral base extending between distal ends of the legs such that the base and the legs cooperatively form a "U" shaped profile, the base including a nose projecting in angled, transverse relation to a plane defined by the outboard contact surface;
an integral snap wing extending in angled relation away from the base, the snap wing including a lower wing segment having an outer surface forming a first angle relative to an underside of the head portion and an upper wing segment extending to a free edge, the upper wing segment having an outer surface forming a second, steeper angle relative to the underside of the head portion, the outer surface of the lower wing segment including one or more longitudinal raised ribs of curved profile extending at least partially along a length of the lower wing segment.

12. The snap-in bracket clip as recited in claim 11, wherein the bracket clip is of unitary molded construction of polymeric material.

13. The snap-in bracket clip as recited in claim 12, wherein the head portion includes a convex curved upper surface defining a curved surface extending between the outboard boundary edge and the inboard boundary edge.

14. The snap-in bracket clip as recited in claim 13, wherein the head portion includes a planar lower surface adapted for disposition in overlying relation to an upper surface of the insert flange.

15. The snap-in bracket clip as recited in claim 14, wherein each of the legs includes an inboard leg surface of dog-leg configuration including an upper linear segment oriented in parallel relation to the outboard contact surface, the inboard leg surface further including a lower angled surface oriented in a plane transverse to the outboard contact surface.

16. The snap-in bracket clip as recited in claim 14, wherein the base includes nose projecting in angled, transverse relation to a plane defined by the outboard contact surface.

17. The snap-in bracket clip as recited in claim 14, further comprising a pair of elbow hinges, each of the elbow hinges operatively connecting the snap wing to a leg.

* * * * *